US008406793B2

(12) United States Patent
Russell et al.

(10) Patent No.: US 8,406,793 B2
(45) Date of Patent: Mar. 26, 2013

(54) METHOD AND APPARATUS FOR MESSAGE DELIVERY

(75) Inventors: Nick Russell, Newbury (GB); Peter Dawes, Newbury (GB); David Hutton, Newbury (GB)

(73) Assignee: Vodafone Intellectual Property Licensing Limited, Newbury, Berkshire (GB)

( * ) Notice: Subject to any disclaimer, the term of this patent is extended or adjusted under 35 U.S.C. 154(b) by 454 days.

(21) Appl. No.: 12/658,611

(22) Filed: Feb. 9, 2010

(65) Prior Publication Data

US 2010/0222089 A1 Sep. 2, 2010

(30) Foreign Application Priority Data

Feb. 9, 2009 (GB) .................................. 0902014.0

(51) Int. Cl.
*H04W 4/00* (2009.01)
(52) U.S. Cl. ...................... 455/466; 455/412.1; 370/230; 370/349; 709/206; 709/207
(58) Field of Classification Search ............... 455/412.1, 455/466; 709/206, 207; 370/230, 349
See application file for complete search history.

(56) References Cited

U.S. PATENT DOCUMENTS 7,398,080 B2 * 7/2008 Pyhalammi et al. ........ 455/412.1
2008/0016575 A1 * 1/2008 Vincent et al. ................ 726/26

* cited by examiner

*Primary Examiner* — Amancio Gonzalez
(74) *Attorney, Agent, or Firm* — Muirhead and Saturnelli, LLC

(57) ABSTRACT

An apparatus for delivering a message from an originating subscriber to a target subscriber across a communication network comprising; means for receiving in a first network a message from an originating subscriber to a target subscriber and an identifier of the target subscriber, the target subscriber being associated with the first network and the originating subscriber being associated with a second network, the message and identifier being received from the second network; means for identifying at least one network node associated with the target subscriber and being responsible for delivering messages to the target subscriber; means for selecting a network node from the at least one network node for delivery of the message; means for receiving from the second network an allowed time period for delivery of the message; means for determining the expected delivery time of the message for the selected network node; means for comparing the expected delivery time with the allowed time period for delivery; and means for forwarding the message to the selected network node for delivery to the target subscriber in dependence on the allowed time period exceeding the expected delivery time.

20 Claims, 3 Drawing Sheets

METHOD AND APPARATUS FOR MESSAGE DELIVERY

TECHNICAL FIELD

This application relates to a method and apparatus for message delivery and, in particular, to a short message delivery technique in a network supporting multiple mobile technology access domains.

BACKGROUND OF THE INVENTION

The Short Message Service (SMS) is a popular means of communication over mobile networks in which subscribers can send data, predominantly, text messages across the mobile network to other subscribers. Different mobile technology domains have been introduced over recent years and it is now possible to send SMS messages over IP Multimedia Subsystem (IMS), Packet Switched (PS) and Circuit Switched (CS) domains. Often the devices of mobile subscribers will be registered on multiple technology access domains simultaneously.

In the network architecture for SMS delivery, when a sending party sends a Short Message (SM) to a target party, the sending party's home network provides the SM to either the home network or serving network of the target party and waits for confirmation that the SM has been delivered successfully. In the former case, the home network of the target party takes responsibility for delivering the message and also takes responsibility for retrying in the case of a delivery failure. In the latter case it is the sending party's home network that takes responsibility. However, this case limits the mobile technology access domains to which the SM can be delivered to PS and CS.

After the sending party network has forwarded the SM to the respective target party network and before it receives confirmation that the message has been delivered, the sending party's home network keeps open the communication channel (or "dialogue") with the target party's serving network. This open dialogue takes up network resource and, in busy and congested networks, it is inefficient to keep this dialogue open for any extended time period. This problem is exacerbated in the case where the home network of the target party takes responsibility for delivering the SM, as it has to try potentially up to three mobile technology access domains for delivering the SM to the subscriber (i.e. IMS, PS and CS). The case where the sending party's home network takes responsibility for delivering the message is less problematic as the sending party's home network will receive a response after trying each mobile technology access domain and so can better manage its network resource.

Current networks only keep the communication dialogue open for a predefined time period after the SM has been forwarded to the target party's network. This is managed by a delivery timer. Typically, this time period is between one and ten minutes. Network operators regularly set the timer to one minute in order to release their network resource as soon as possible. If the sending network receives confirmation that the message has been successfully received by the receiving party before the expiry of the predefined time period the timer is stopped and the resource is reallocated. However, if no confirmation is received before the expiry of the predefined time period, the delivery timer times out. Upon time out, the sending network may either: a) immediately try to send the message again by resending the message request to the target party's network (possibly with the same failed outcome); b) initiate a procedure to receive an identifier from the receiving party's network when the target party's device (UE) becomes available; or, c) give up entirely and assume there is some system failure in the target party network.

None of these outcomes are entirely satisfactory. In cases (a) and (b) above, the recipient may end up receiving the SM twice, or, the resending of the SM may produce an error in the target party's network, which is currently trying to deliver the first message. In case (c) the recipient may not receive the SM at all.

In the case that the target party is registered in multiple mobile technology access domains, the sending party's home network or the receiving party's home network (depending upon which has taken responsibility for delivering the message) will page each technology access domain in turn until it finds the technology access domain upon which the UE is currently residing (if it is the sending party's home network though, only two mobile technology access domains can be attempted). Typically, both the sending party's home network and the target party's home network will use a predefined mobile technology access domain hierarchy for paging the target party's UE. Once the SM has been delivered successfully, the target party's serving network confirms to either the sending party's home network or target party's home network that the SM has been delivered successfully, and the communication dialogue is closed (and resources can be reallocated to other purposes).

As more mobile technology domains are introduced and utilised by networks and subscribers, the chances of delivery taking longer than the predefined time out period is increased since the networks may have to try several technologies before finding the one on which the device is currently camped.

One solution would be to increase the time-out period of the sending party's delivery system. However, this would increase the maximum period for which the sending party resource was taken up. Therefore, this is not an ideal solution.

The applicants have appreciated that errors can occur when the delivery timer of an SM times out before the home network of the sending party or the target party has successfully delivered the SM. It is not an ideal solution to extend the period of the delivery timer.

SUMMARY OF THE INVENTION

Embodiments of the system described herein address the delivery of an SM via the target party's home network and overcome the problems stated with the current systems by the sending party's home network informing the target party's home network of the time out time period of the delivery system. Such embodiments provide the advantage that the target party's network can monitor the time until the delivery system times out and in the case that it has not successfully delivered the SM as the time out period approaches, it is able to inform the sending party's delivery system that the message is not yet delivered. The sending party network may allocate an extended time period for delivering the SM. Such embodiments help prevent errors being created in the delivery of the SM.

In further embodiments, the sender's delivery system includes the time and date that the SM was sent to the target party's home network when it forwards the SM. Such embodiments provide the advantage that the target party's home network can identify any delays in the SM being forwarded to it and allows it to make an accurate measure of the remaining time period of the delivery timer.

In further embodiments, the target party may indicate to the sending party the number of technology access domains on which the target subscriber is registered. The sending party network may then allocate an appropriate delivery time for attempting to deliver the SM to each of those technology access domains. Such embodiments provide the advantage that network resource can be allocated appropriately considering the expected time period for delivery.

BRIEF DESCRIPTION OF THE DRAWINGS

Embodiments of the system described herein are now described with reference to the accompanying figures in which.

DETAILED DESCRIPTION OF VARIOUS EMBODIMENTS

Figure 1:
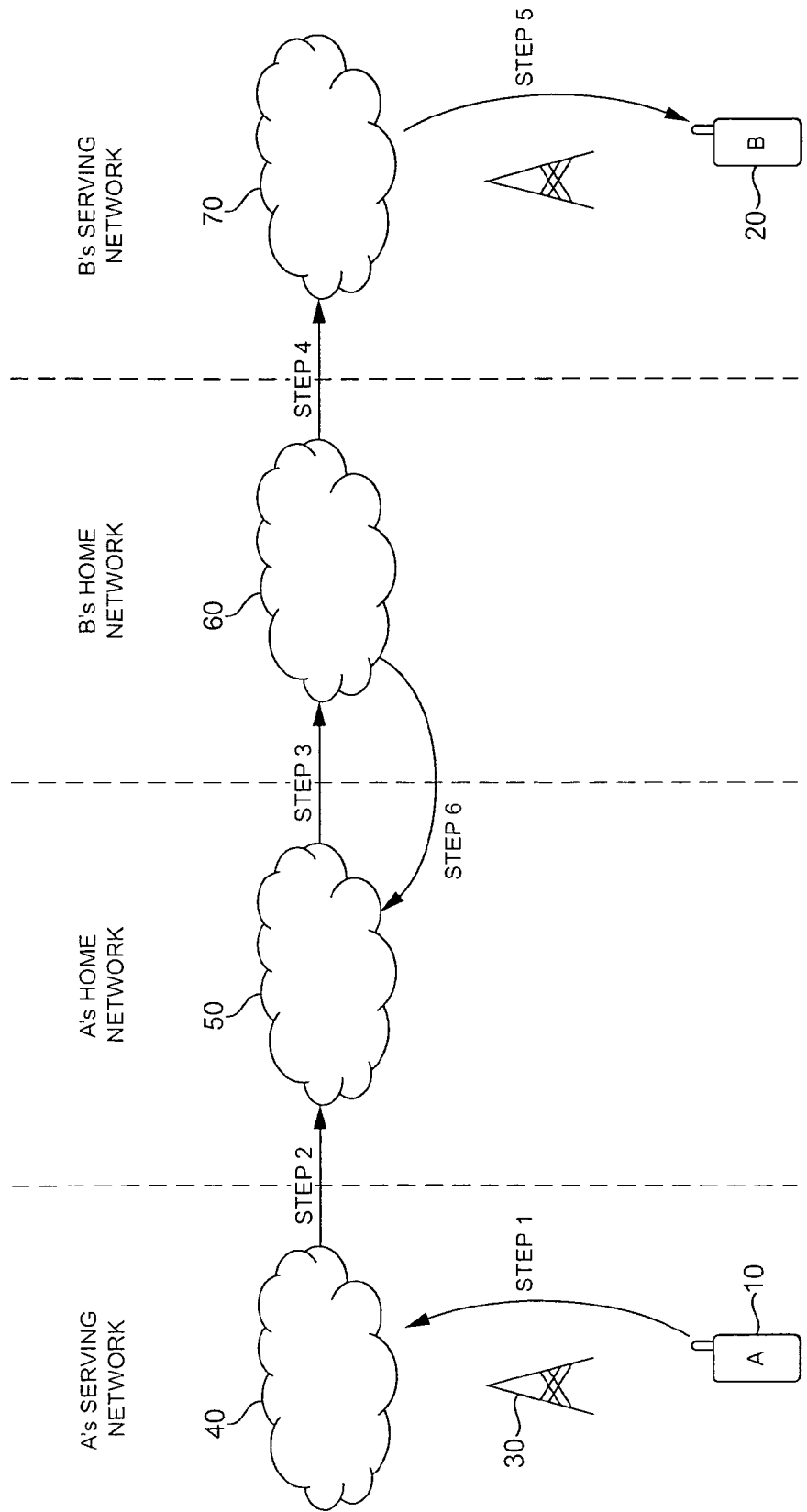
FIG. 1 shows the delivery of an SM between communication networks, where the receiving party's home network takes responsibility for delivering the message.

FIG. 1 shows the delivery route of an SM between two mobile communication devices. Mobile device A (10) sends a SM to mobile device B (20). The user of mobile device A creates an SM, selects the target recipient (mobile device B) and hits the send key on his device. Mobile device A is operating within a local mobile network 40. At step 1, the SM and the Mobile Station ISDN Number (MSISDN) of the target recipient are transmitted from the device to the local mobile network via the device's serving base station 30. The local network 40 receives the SM, and MSISDN of the target subscriber B. The local network 40 also holds the IMSI of the sending party and this is associated with the SM and target MSISDN.

In order to route the message, the local network 40 identifies subscriber A's home network 50 from A's IMSI. At step 2, A's serving network forwards the SM, the IMSI of subscriber A, and the MSISDN of target subscriber A to A's home network 50. This information is forwarded to the Short Message Service Centre (SMSC) of A's home network.

On receiving the SM, the IMSI of subscriber A, and the MSISDN of the target subscriber B, A's home network 50 uses B's MSISDN to identify B's home network 60. At Step 3, A's home network forwards the SM, the IMSI of subscriber A, and the MSISDN of target subscriber B to B's home network 60.

B's home network 60 is then responsible for delivering the SM to subscriber B at Step 4. Once the SM has been delivered successfully to B, B's home network 60 confirms to A's home network 50 that the SM has been delivered successfully at Step 6.

In FIG. 1, A's serving network, A's home network, B's home network and B's serving network are depicted as different networks. However, some or all of the networks may, in fact, be the same network.

Figure 2:
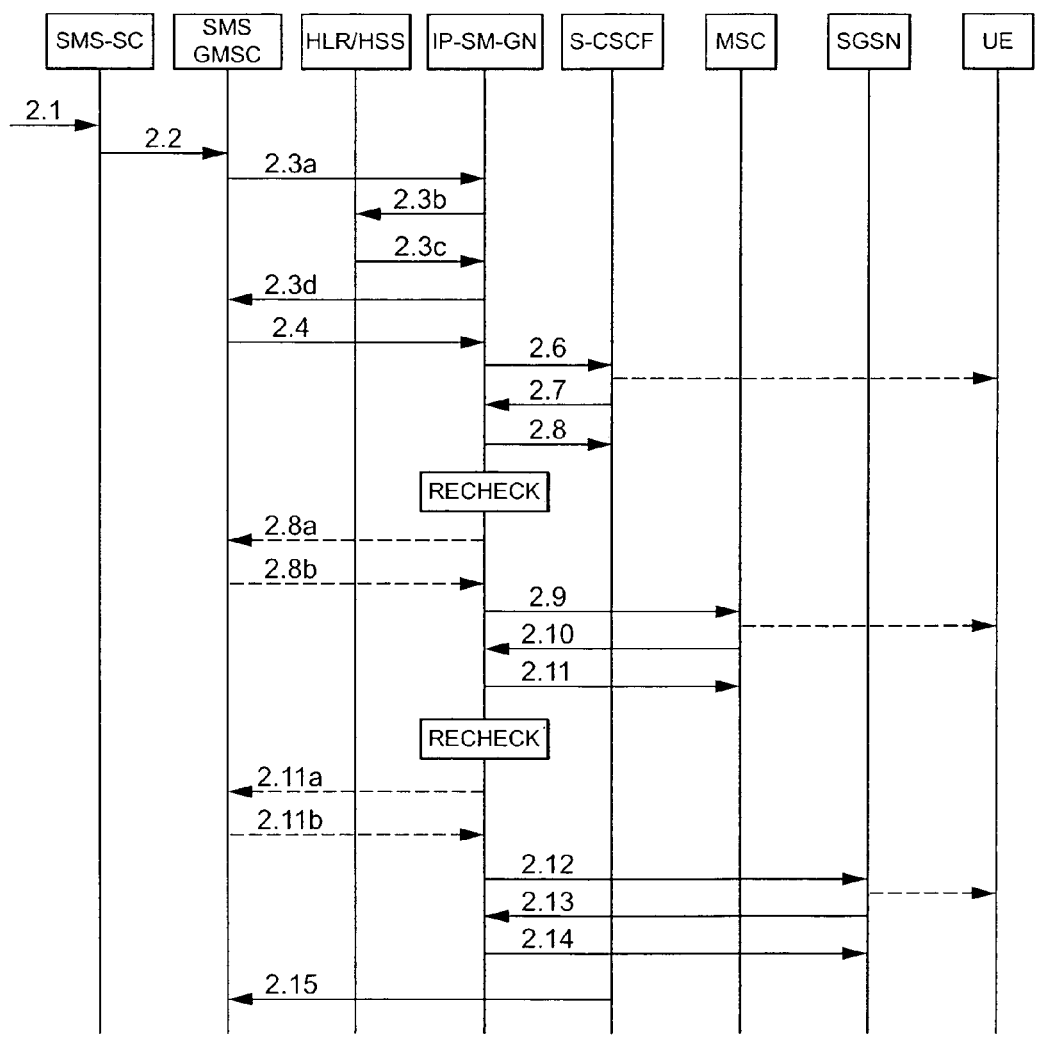
FIG. 2 shows the network architecture components and message flows during SMS delivery.

FIG. 2 shows a more detailed view of the architectural network components involved in SMS delivery and the message flows between the components. At step 2.1 the SM from the sending party is received at the sending party's SMS Service Centre (SMS-SC) along with the MSISDN of the target party. The IMSI of the sending party is also associated with this data. The SMS-SC first determines to which network the target party is registered using the MSISDN of the target party. MSISDN includes: a country code, for example 44, which identifies the country of the subscriber's home network; a network code which identifies the network to which the subscriber is registered; and a subscriber identity which allows the subscriber's home network to recognise him uniquely. The SMS-SC checks the mobile country code and mobile network code to confirm the home network of the target subscriber. The SMS-SC holds a database of addresses for each network and it will interrogate its database for the network address of the target subscriber's home network. If the target party's network is part of a Mobile Number Portability (MNP) community, then the last transit network before the target party's network typically takes care of finding the correct, or "ported-to", network.

Historically, in SMS standards, the sending party's network has taken responsibility for delivering the SM. It obtains the network delivery address for the target subscriber and the IMSI for the target subscriber by contacting the home network of the target device and asking for this information.

The node in the network responsible for forwarding the message and obtaining the information from the home network of the target subscriber is the SMS-GMSC. At step 2.2 the SMS-SC forwards the SM along with the MSISDN of the target subscriber to the SMS Gateway MSC (SMS-GMSC). In FIG. 2, the SMS-SC and SMS-GMSC are shown as separate entities but, in certain implementations, these may be incorporated into the same physical entity.

The SMS-GMSC looks-up the network address for the target subscriber's home network and then interrogates it for the current network address(es) associated with the target subscriber's currently serving mobile technology access domain(s) and the target subscriber's IMSI at step 2.3a. On entry into the target subscriber's home network, this message is routed to the IP-SM-Gateway (IP-SM-GW) of the target subscriber network.

At 2.3b, the IP-SM-GW interrogates the Home Location Register (HLR) to obtain the network addresses for the nodes handling the target device's traffic. The HLR consults its database and provides the IP-SM-GW with the IMSI of the target subscriber and the network address of the S-CSCF, MSC and SGSN currently associated with the target subscriber. In the situation that the target subscriber is not associated with a S-CSCF, MSC or SGSN the address for that mobile technology domain is not sent.

The Home Location Register of a network is a database which stores the current routing information of all its registered subscribers. The MSISDN of the subscriber is stored along with the IMSI and the network address of the network nodes which are currently managing traffic to and from the subscriber. The HLR stores network node address information for the network subscribers on all domains on which the subscriber is currently registered, including MSC address for Circuit Switched traffic, SGSN for Packet Switched traffic and S-CSCF for IMS traffic.

The address data is kept up to date by the HLR. For example, in the Circuit Switched domain, when the subscriber moves into a cell supported by a different MSC, the location update is provided to the HLR for the subscriber and the HLR stores the current location of the device. Every time the subscriber changes location to a new MSC, the HLR keeps a record of this and so it knows its current location. Therefore, when a network needs to know the current network address for the subscriber, the HLR for the subscriber can provide it with that information. Similar updates are provided in the Packet Switched and IMS domains for the current SGSN and S_CSCF respectively.

In current architectures, the home network prefers to take responsibility for delivering the SM to its subscriber rather than allowing the sending party's home network to deliver the message. However, legacy SMS-GMSCs expect to deliver the message themselves and are expecting to be provided with an IMSI for the target party and a network address for the node handling the traffic for the target party.

Many current networks deal with this situation by allowing the IP-SM-GW to take control of the delivery of the SM. In order that the SMS-GMSC of the sending party is not confused, the IP-SM-GW pretends to be the target device. The home network of the receiving party performs this by pretending that it is the network node handling the traffic for the target subscriber e.g. MSC.

On receiving the network address and IMSI data from the HLR at 2.3c, the IP-SM-GW creates a record for the target subscriber in its database including all this data. It now knows the IMSI for the target device and how to communicate with it (since it now holds the network addresses for the MSC, SGSN and S-CSCF associated with the target subscriber). It assigns a Mobile Terminating (MT) Correlation ID to the data. The MT Correlation ID is designed to appear like an IMSI. In order to retrieve the SM from the sending party's SMS-GMSC, it provides the SMS-GMSC with its network address and the MT Correlation ID assigned to the target party's data. This is provided to the SMS-GMSC at step 2.3d.

The SMS-GMSC receives the response from the IP-SM-GW including the network address of the IP-SM-GW and the MT Correlation ID. To the SMS-GMSC, this appears to be the IMSI for the target device and the network address of the node handling the target device's traffic.

In response to this message, the SMS-GMSC forwards to the IP-SM-GW the SM along with its network address in order that the receiving node can send confirmation when the SMS has been delivered. At this point, the SMS-GMSC starts a delivery timer. The duration of the deliver timer is the time period for which the SMS-GMSC will wait for confirmation that the SMS has been delivered and during which it will keep open its communication channel (dialogue) with the IP-SM-GW. The duration of the timer is provided to the IP-SM-GW along with the SM and SMS-GMSC network address in step 2.4.

At step 2.4 the IP-SM-GW receives the SM, the MT Correlation ID and delivery timer duration. It uses the MT Correlation ID to match the SM to the target party details which it received from its HLR. The IP-SM-GW now holds: a) the SM; b) the network addresses for the MSC, SGSN and S-CSCF at which the subscriber is registered; c) the time period within which the SMS-GMSC is expecting to receive confirmation of whether or not the SMS has been delivered; and, d) the network address of the SMS-GMSC to which it should send delivery confirmation. The IP-SM-GW stores the value of the deliver timer time period and starts its own timer in order that it can monitor the time period remaining within which the sending network expects to receive a response confirming the status of the SM delivery. The IP-SM-GW now takes on responsibility for delivering the SMS message.

The IP-SM-GW attempts to send the SM to each mobile technology access domain entity separately and consecutively. Typically, there is a predefined hierarchy defining the order in which the mobile technology access domains are contacted. The order of the hierarchy may be defined by the network or may be defined on a subscriber specific basis. Examples of factors which may influence the order in which the domains are contacted include operator policy, the mobile technology access domains in which the subscriber is registered, the type of subscription the target subscriber holds or the type of device the target subscriber holds. There may be other additional and alternative factors.

The IP-SM-GW holds an expected delivery time for each domain entity. The time period may be based on the domain itself, the location of the subscriber, the location of the current serving network for the target subscriber or any other relevant factor.

In the example of FIG. 2, the hierarchy order is IMS, then Circuit Switched, then, finally, packet switched. The IP-SM-GW attempts the IP domain first and sends the SM along with the IMSI of the receiving party to the S-CSCF at step 2.6. On receipt of the SM, the S-CSCF identifies whether the IMSI is currently registered in its domain. If the IMSI is registered, the S-CSCF attempts to deliver the SM to the receiving party. The S-CSCF then sends a delivery report to the IP-SM-GW if the message has been delivered at 2.7. If the IMSI is not registered with the S-CSCF, the S-CSCF sends a delivery report to the IP-SM-GW reporting that the IMSI is not currently registered in its domain at 2.7. On receipt of the delivery report, the IP-SM-GW acknowledges receipt of the delivery report to the S-CSCF at step 2.8. A reason why the IMSI may not be registered with the S-CSCF is, for example, the subscriber has registered with a different S-CSCF during the time period between the IP-SM-GW requesting the addresses from the HLR and the SM arriving at the S-CSCF. The S-CSCF may be unable to deliver the SM if, for example, the subscriber device is out of IP network coverage.

If the message was successfully delivered the IP-SM-GW sends a delivery report back to the SMS-GMSC of the sending party at 2.8a confirming successful delivery of the SM. The IP-SM-GW records the confirmation, stops its timer for this message and deletes its records for this SMS message. The SMS-GMSC can then reallocate this resource to different message at a later time. On receipt of the message, the SMS-GMSC acknowledges receipt at 2.8b. On sending the successful message, the IP-SM-GW can terminate its timer for this message and delete its records relating to this message delivery.

If, at step 2.7, the S-CSCF reported that the IMSI was not registered in its domain or that the delivery was unsuccessful, the IP-SM-GW will need to attempt to deliver the SMS message to the subscriber in the second hierarchical access domain, namely the circuit switched domain. Before retrying, the IP-SM-GW checks the time remaining on the timer. If the timer includes sufficient time for the IP-SM-GW to attempt to deliver the SM to the MSC, it will start the delivery process to the MSC at step 2.9. However, if the expected time taken to deliver the message to the MSC exceeds that remaining on the timer, the IP-SM-GW sends a delivery report to the SMS-GMSC at step 2.8a confirming that it has been unable to deliver the SM. Typically, the IP-SM-GW will store the history of this delivery against the MT Correlation ID and provide the MT Correlation ID in the delivery report.

The delivery report may be in the form of a standard error message or may provide more information about the sequence of events so far. The advantage of using a standard error message is that if the SMS-GMSC is a legacy device it may not recognise a different error message.

On receipt of the message at 2.8a, the SMS-GMSC can re-issue the message delivery request to the IP-SM-GW which will restart the delivery timer. In further embodiments, the SMS-GMSC may change the timer value to a longer or shorter time period. At step 2.8b the SMS-GMSC resends the delivery message to the IP-SM-GW along with the MT Correlation ID and the timer value.

On receipt of the message at step 2.8b, the IP-SM-GW matches the MT Correlation ID to the history stored in its database. It updates the timer value, stores the new timer value and monitors the time period. The IP-SM-GW identifies from the history associated with this MT Correlation ID that it has attempted to deliver the message in the IP domain unsuccessfully. It will then identify the next priority access domain for the subscriber as Circuit Switched and checks whether the expected time to deliver the message in the CS domain is less than the remaining time on the timer. If the expect time is less than the remaining time on the timer, the IP-SM-GW commences delivery of the message at 2.9. If the expected time exceeds the remaining time, the IP-SM-GW sends a report back to the SMS-GMSC. Again, this may be in the form of a standard error message. In most cases the timer will exceed the expected time for delivery in a single domain and so very rarely will the error message be sent immediately.

On receipt of the SM at step 2.9 the MSC identifies whether the IMSI is currently registered in its domain. If the IMSI is registered, the MSC attempts to deliver the SM to the target party. The MSC then sends a delivery report to the IP-SM-GW if the message has been delivered at 2.10. If the IMSI is not registered with the MSC, the MSC sends a delivery report to the IP-SM-GW reporting that the IMSI is not currently registered in its domain at 2.10. On receipt of the delivery report, the IP-SM-GW acknowledges receipt of the delivery report to the MSC at step 2.11.

If the message was successfully delivered, the IP-SM-GW sends a delivery report back to the SMS-GMSC of the sending party at 2.11a confirming successful delivery of the SM. The IP-SM-GW records the confirmation, stops its timer for this message and closes its records for this SM. The SMS-GMSC can then reallocate this resource to different message. On receipt of the message, the SMS-GMSC acknowledges receipt at 2.11b. On sending the successful message, the IP-SM-GW can terminate its timer for this message and delete its records relating to this message delivery.

If, at step 2.10, the MSC reported that the IMSI was not registered in its domain, the IP-SM-GW will need to attempt to deliver the SM to the subscriber in a different domain, in this case the, final, packet switched domain. Before retrying, the IP-SM-GW checks the time remaining on the timer. If the timer includes sufficient time for the IP-SM-GW to attempt to deliver the SMS message in a Packet Switched domain, it will restart the delivery process in the Packet Switched domain at 2.12. However, if the expected time taken to deliver the message to the SGSN exceeds that remaining on the timer, the IP-SM-GW sends a delivery report to the SMS-GMSC at step 2.11a confirming that it has been unable to deliver the SM. Typically, the IP-SM-GW will store the history of this delivery against the MT Correlation ID and provide the MT Correlation ID in the delivery report.

The delivery report may be in the form of a standard error message or may provide more information about the sequence of events so far. The advantage of using a standard error message is that if the SMS-GMSC is a legacy device it may not recognise a different error message.

On receipt of the message at 2.11a, the SMS-GMSC can re-issue the message delivery request to the IP-SM-GW which will restart the delivery timer. In further embodiments, the SMS-GMSC may change the timer value to a longer or shorter time period. At step 2.11b the SMS-GMSC resends the delivery message to the IP-SM-GW along with the MT Correlation ID and the timer value.

On receipt of the message at step 2.11b, the IP-SM-GW matches the MT Correlation ID to the history stored in its database. It updates the timer value, stores the new timer value and monitors the time period. The IP-SM-GW identifies from the history associated with this MT Correlation ID that it has attempted to deliver the message in the IP domain and CS domain unsuccessfully. It will then identify the next priority access domain for the subscriber as Packet Switched (PS) and checks whether the expected time to deliver the message in the PS domain is less than the remaining time on the timer. If the expect time is less than the remaining time on the timer, the IP-SM-GW commences delivery of the message at 2.12. If the expected time exceeds the remaining time, the IP-SM-GW sends a report back to the SMS-GMSC. Again, this may be in the form of a standard error message. In most cases the timer will exceed the expected time for delivery in a single domain and so very rarely will the error message be sent immediately.

If the timer exceeds the time expected for delivery in packet switched domain the IP-SM-GW sends the IMSI and SM to the SGSN. The IP-SM-GW retrieves the network address for the SGSN currently supporting the subscriber and forwards the IMSI and SM to the SGSN.

On receipt of the SM, the SGSN identifies whether the IMSI is currently registered in its domain. If the IMSI is registered, the SGSN attempts to deliver the SMS to the receiving party. The MSC then sends a delivery report to the IP-SM-GW if the message has been delivered at 2.13. If the IMSI is not registered with the SGSN, the SGSN sends a delivery report to the IP-SM-GW reporting that the IMSI is not currently registered in its domain at 2.13. On receipt of the delivery report, the IP-SM-GW acknowledges receipt of the delivery report to the SGSN at step 2.14.

If the message was successfully delivered the IP-SM-GW sends a delivery report back to the SMS-GMSC of the sending party confirming successful delivery of the SMS at 2.15. The IP-SM-GW records the confirmation, stops its timer for this message and closes its records for this SMS. The SMS-GMSC can then reallocate this resource to different message.

If the subscriber was not registered in the packet switched domain, the system has failed to deliver the message in all domains in which the subscriber is registered. In which case, an error is returned to the SMS-GMSC at 2.15 indicating an absent subscriber, which in turn, forces the SMS-SC to ask the HLR to inform it of when the subscriber reappears.

Further intelligence may be included into the SMS-GMSC to facilitate more efficient SM delivery. For example, the SMS-GMSC may monitor the number of error messages it receives from a particular message delivery request. When re-forwarding the short message after an error report from the IM-SM-GW it may adjust the timer time period based on the number of consecutive error messages received.

Figure 3:
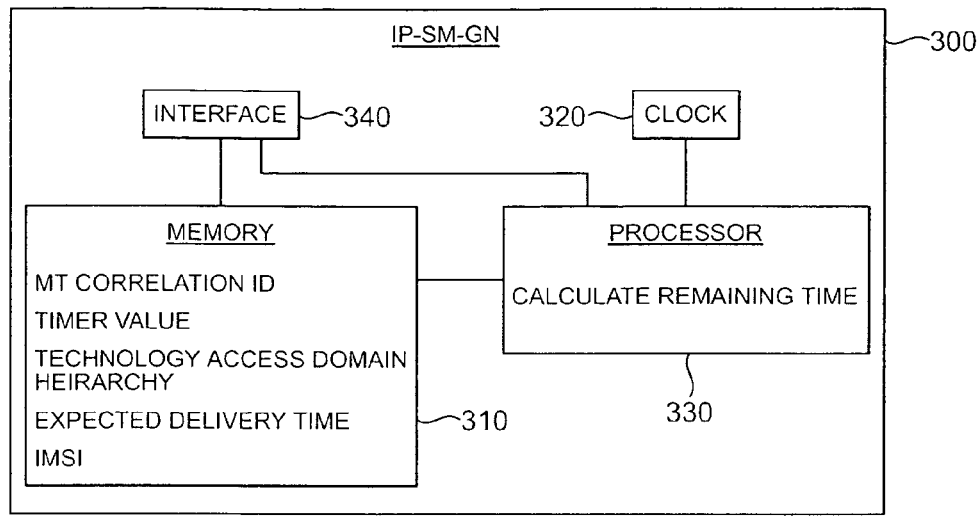
FIG. 3 is a block diagram showing the components of the IP-SM-GW in an embodiment of the invention.
Figure 4:
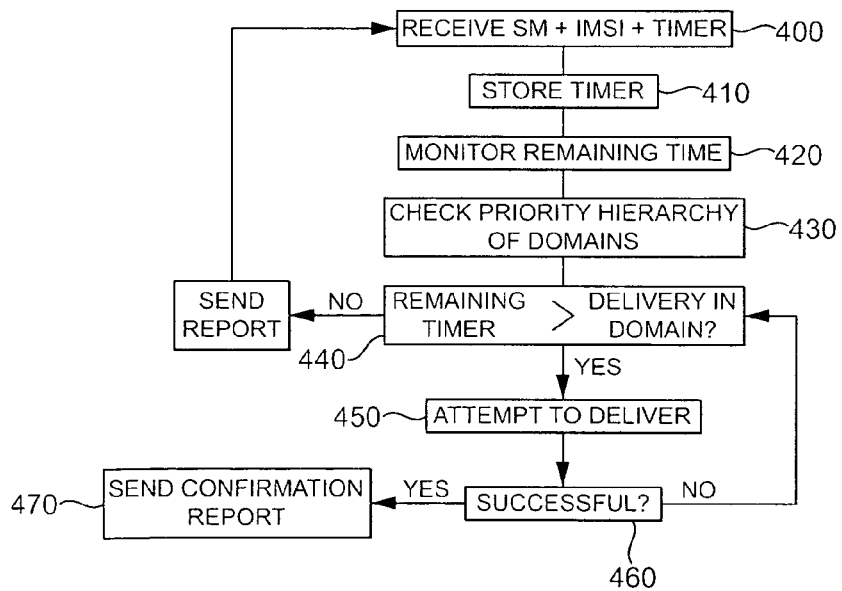
FIG. 4 is a flow diagram showing message flows and decisions made during SMS delivery.

FIG. 3 is a block diagram showing the components within the IP-SM-GW 300 involved in implementing an embodiment of the present invention. FIG. 4 is a flow diagram showing the message flows and decisions made by the components of the IP-SM-GW. At 400, the SM, IMSI and timer value are received from the SMS-GMSC through interface 340. At 410 the timer value is stored in the memory of the IP-SM-GW 310 along with the MT Correlation ID associated with this SM delivery and the technology access domain addresses with which the target subscriber is registered and the IMSI of the target subscriber which the IP-SM-GW received from the HLR.

IP-SM-GW includes a clock 320 and a processor 330 which compares the timer value with the clock to monitor the remaining time left on the delivery timer of the IP-SM-GW. This is monitored at step 420.

At 430 the list of technology access domains and the hierarchy of those access domains is checked and the remaining time on the delivery timer is compared with the expected delivery time in the next technology domain at 440. If the remaining time on the timer exceeds the expected time for delivery in the next technology access domain then the IP-SM-GW attempts to deliver the message by providing the SM and IMSI to the technology access domain at 450. If not, then an error message is sent to the SMS-GMSC.

If the delivery is successful at 460 a confirmation report is sent to the SMS-GMSC at 470. If the delivery is unsuccessful, the IP-SM-GW considers delivering to the next technology access domain in the hierarchy at 440.

In the embodiments discussed above, the SMS-GMSC forwarded the message along with the timer value within which the SMS-GMSC expects to receive confirmation of whether the message has been delivered. In practice, there is a finite time taken to deliver the SMS message from the SMS-GMSC to the IP-SM-GW. This may be very small if both the SMS-GMSC and IP-SM-GW are located in the same country, for example if they are both associated with networks in the UK. However, in the case that the networks are located very far apart geographically, for example if the SMS-GMSC is located in a network in the United Kingdom and IP-SM-GW is located in a network in Australia, the delivery time may be longer. Also, there may be a delay in the delivery. Therefore, when the IP-SM-GW receives the timer value, this will not be an accurate reflection of the time remaining on the timer when it receives the message.

In a further embodiment of the invention, at Step 2.4, when the SMS-GMSC forwards the MT Correlation ID and SM to the IP-SM-GW, it includes a time and date stamp of when the SM was sent from the SMS-GMSC as well as the timer value and SMS message. In this case, when the IP-SM-GW receives the SM it can compare the time and date stamp with its own network clock to identify the time taken for delivery and to accurately calculate the value of the time remaining on the SMS-GMSC timer. Such embodiments assuming that the internal clocks in the SMS-GMSC and the IP-SM-GW are fairly well synchronised. The advantage of such embodiments is that the IP-SM-GW can account for any delays in the delivery time of the MS from SMS-GMSC to the IP-SM-GW. For example, if the timer value is 60 seconds and the delivery time is 20 seconds, the IP-SM-GW can identify that there is only 40 seconds remaining on the timer and can manage its delivery resource accordingly. If it had not been provided with a time stamp, on receiving the SM it would have set its timer to 60 seconds.

In further embodiments, the SMS-GMSC may send the time and date that the timer will expire (i.e. an absolute time, rather than a relative time) at step 2.4. Again, this allows the IP-SM-GW to accurately calculate the value of the time remaining on the SMS-GMSC timer.

In further embodiments of the invention, the IP-SM-GW may inform the SMS-GMSC at step 2.3*d* in FIG. 2 the number of mobile technology access domains to which SM delivery will be attempted. The IP-SM-GW already has this information from the HLR at step 2.3*c*. On receipt of this information, the SMS-GMSC can account for the number of domains when it allocates a timer value. For example, if the IP-SM-GW indicates that the target subscriber is registered in three technology access domains, the SMS-GMSC may set its timer to 90 seconds. However, if the target subscriber is registered to a single technology access domain, the SMS-GMSC may set its timer to 30 seconds. Such embodiments give the SMS-GMSC information which allows it to make intelligent decisions on how to allocate its resource. The SMS-GMSC may also take additional factors into account when setting the timer, for example network congestion. In such embodiments, the IP-SM-GW may also indicate to the SMS-GMSC that it is a IP-SM-GW and that it will be handling the message delivery.

Various embodiments discussed herein may be combined with each other in appropriate combinations in connection with the system described herein. Additionally, in some instances, the order of steps in the flowcharts or flow diagrams may be modified, where appropriate. Further, various aspects of the system described herein may be implemented using software, hardware, and/or a combination of software and hardware. Software implementations of the system described herein may include executable code that is stored in a computer readable storage medium and executed by one or more processors. The computer readable storage medium may include a computer hard drive, ROM, RAM, flash memory, portable computer storage media such as a CD-ROM, a DVD-ROM, a flash drive and/or other drive with, for example, a universal serial bus (USB) interface, and/or any other appropriate tangible storage medium or computer memory on which executable code may be stored and executed by a processor. The system described herein may be used in connection with any appropriate operating system.

Other embodiments of the invention will be apparent to those skilled in the art from a consideration of the specification or practice of the invention disclosed herein. It is intended that the specification and examples be considered as exemplary only, with the true scope and spirit of the invention being indicated by the following claims.

The invention claimed is:

1. A method for delivering a message from an originating subscriber to a target subscriber across a communication network comprising the steps of:
   receiving in a first network a message from an originating subscriber to a target subscriber and an identifier of the target subscriber, the target subscriber being associated with the first network and the originating subscriber being associated with a second network, the message and identifier being received from the second network;
   identifying at least one network node associated with the target subscriber and being responsible for delivering messages to the target subscriber;
   selecting a network node from the at least one network node for delivery of the message;
   receiving from the second network an allowed time period for delivery of the message;
   determining the expected delivery time of the message for the selected network node;
   before an attempt to deliver the message to the selected network node, comparing the expected delivery time with the allowed time period for delivery;
   when the allowed time period meets or exceeds the expected delivery time, forwarding the message to the selected network node for delivery to the target subscriber; and
   when the expected delivery time exceeds the allowed time period, cancelling the attempt to deliver the message to the selected network node, and sending a negative delivery message to the second network.

2. The method of claim 1, comprising the further step of receiving confirmation from the network node indicating whether or not the message was successfully delivered to the target subscriber in dependence on the message being forwarded to the network node.

3. The method of claim 1, comprising the further step of monitoring a remaining time period of the allowed time period.

4. The method of claim 1, comprising the further steps of:
identifying a further network node from the at least one network node in dependence on the message not being successfully delivered to the target subscriber;
determining the expected delivery time of the message for the further network node;
comparing the expected delivery time for the further network node with the remaining time of the allowed time period;
forwarding the message to the further network node for delivery to the target subscriber in dependence on the remaining time period exceeding the expected delivery time of the second network node.

5. The method of claim 1, further comprising the step of storing data identifying network nodes that did not successfully deliver the message along with an identifier and providing the identifier to the second network with the negative delivery message.

6. The method of claim 1 further comprising the step of receiving at the first network the time at which the allowed time period for delivery of the message commenced.

7. The method of claim 1 further comprising the step of transmitting to the second network the number of identified network nodes.

8. The method of claim 1 wherein the first and second networks are the same network.

9. An apparatus for delivering a message from an originating subscriber to a target subscriber across a communication network, comprising:
a message-receiving component that receives in a first network a message from an originating subscriber to a target subscriber and an identifier of the target subscriber, the target subscriber being associated with the first network and the originating subscriber being associated with a second network, the message and identifier being received from the second network;
a node-identifying component that at least one network node associated with the target subscriber and being responsible for delivering messages to the target subscriber;
a node-selecting component that selects a network node from the at least one network node for delivery of the message;
a time period-receiving component that receives from the second network an allowed time period for delivery of the message;
a time-determining component that determines the expected delivery time of the message for the selected network node;
a comparing component that, before an attempt to deliver the message to the selected network node, compares the expected delivery time with the allowed time period for delivery;
a forwarding component that, when the allowed time period meets or exceeds the expected delivery time, forwards the message to the selected network node for delivery to the target subscriber in dependence on the allowed time period exceeding the expected delivery time; and
a deliver-failure message component that when the expected deliver time exceeds the allowed time period, cancels the attempt to deliver the message to the selected network node, and sends a negative delivery message to the second network.

10. The apparatus of claim 9, further comprising:
a confirmation-receiving component that receives confirmation from the network node indicating whether or not the message was successfully delivered to the target subscriber.

11. The apparatus of claim 9, further comprising:
a monitoring component that monitors a remaining time period of the allowed time period.

12. The apparatus of claim 9, further comprising:
a second node-identifying component that identifies a further network node from the at least one network node when the message is not successfully delivered to the target subscriber;
a second time-determining component that determines an expected delivery time of the message for the further network node;
a second comparing component that compares the expected delivery time for the further network node with the remaining time of the allowed time period;
a second forwarding component that forwards the message to the further network node for delivery to the target subscriber in dependence on a remaining time period exceeding the expected delivery time of the second network node.

13. The apparatus of claim 9, further comprising
a storage component that stores data identifying network nodes that did not successfully deliver the message along with an identifier and means for providing the identifier to the second network with the negative delivery message.

14. The apparatus of claim 9, further comprising:
a further time period-receiving component that receives at the first network the time at which the allowed time period for delivery of the message commenced.

15. The apparatus of claim 9, further comprising:
a transmission component that transmits to the second network the number of identified network nodes.

16. The apparatus of claim 9 wherein the first and second networks are the same network.

17. A non-transitory computer readable medium storing software for delivering a message from an originating subscriber to a target subscriber across a communication network, the software comprising:
executable code that receives in a first network a message from an originating subscriber to a target subscriber and an identifier of the target subscriber, the target subscriber being associated with the first network and the originating subscriber being associated with a second network, the message and identifier being received from the second network;
executable code that identifies at least one network node associated with the target subscriber and being responsible for delivering messages to the target subscriber;
executable code that selects a network node from the at least one network node for delivery of the message;
executable code that receives from the second network an allowed time period for delivery of the message;
executable code that determines the expected delivery time of the message for the selected network node;
executable code that, before an attempt to deliver the message to the selected network node, compares the expected delivery time with the allowed time period for delivery;
executable code that, when the allowed time period meets or exceeds the expected delivery time, forwards the message to the selected network node for delivery to the target subscriber; and executable code that, when the expected delivery time exceeds the allowed time period, cancels the attempt to deliver the message to the selected network node, and sends a negative delivery message to the second network.

18. The non-transitory computer readable medium of claim 17, wherein the software further comprises:

executable code that receives confirmation from the network node indicating whether or not the message was successfully delivered to the target subscriber in dependence on the message being forwarded to the network node.

19. The non-transitory computer readable medium of claim 18, wherein the software further comprises:

executable code that identifies a further network node from the at least one network node in dependence on the message not being successfully delivered to the target subscriber;

executable code that determines the expected delivery time of the message for the further network node;

executable code that compares the expected delivery time for the further network node with the remaining time of the allowed time period; and executable code that forwards the message to the further network node for delivery to the target subscriber in dependence on the remaining time period exceeding the expected delivery time of the second network node.

20. The non-transitory computer readable medium of claim 18, wherein the software further comprises:

executable code that stores data identifying network nodes that did not successfully deliver the message along with an identifier and means for providing the identifier to the second network with the negative delivery message.

* * * * *